United States Patent Office 3,267,066
Patented August 16, 1966

3,267,066
PROCESS FOR THE CROSS-LINKING OF POLYOLEFINS AND FOR THE VULCANIZATION OF RUBBER
Stephanus Bernardus Tijssen, Deventer, Netherlands, assignor to Koninklijke Industrieele Maatschappij Voorheen Noury & van der Lande N.V., Deventer, Netherlands
No Drawing. Original application June 2, 1961, Ser. No. 114,320. Divided and this application Aug. 20, 1964, Ser. No. 412,270
Claims priority, application Great Britain, June 8, 1960, 20,154/60
1 Claim. (Cl. 260—41)

The present invention relates to a process for cross-linking as well as vulcanisation of natural and synthetic rubbers with the aid of the ditertiary peroxides prepared by the process according to the present invention.

This application is a division of my co-pending application Serial No. 114,320, filed June 2, 1961, and now abandoned.

The process for the preparation of ditertiary peroxides in accordance with the present invention comprises effecting reaction in the presence of an acid reacting compound, between equimolar quantities of (1) a tertiary hydroperoxide and (2) a compound selected from the group consisting of (a) compounds represented by the general formula

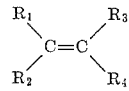

and (b) compounds represents by the general formula

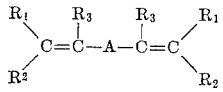

wherein each $R_1$ and $R_2$ is selected from the group consisting of hydrogen, alkyl, cycloalkyl, and aryl and each $R_3$ and $R_4$ is selected from the group consisting of alkyl, cycloalkyl and aryl and A represents a hydrocarbon group having up to 6 carbon atoms and may be aromatic or aliphatic.

*The tertiary hydroperoxide*

The tertiary hydroperoxide used as one of the starting materials in the preparation of the organic peroxides according to the present invention may be an aliphatic tertiary hydroperoxide such as a tertiary alkyl hydroperoxide e.g. tertiary butyl hydroperoxide or tertiary amyl hydroperoxide; or a cycloalkyl hydroperoxide such as paramenthane hydroperoxides or an aralkylhydroperoxide such as cumylhydroperoxide. Furthermore halogenated derivatives of the above groups of compounds may be used in their stead, as for example 1-chloro-2-methyl-2-hydroperoxy-propane and 1,1-dichloro-2-methyl-2 - hydroperoxypropane.

*The unsaturated olefinic compound*

The tertiary hydroperoxide described above is reacted with a suitable olefinic compound of the type described above wherein (b) is merely a specific species of (a) in which $R_4$ has the significance of

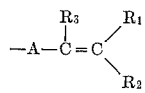

Suitable olefinic compounds for reaction with the tertiary hydroperoxide include amongst others alpha methylstyrene, parachloro-alpha methylstyrene, diisopropenylbenzene, diisobutylene, 2,5-dimethyl-hexadiene-1,5- and dipentene. The above list of compounds is merely illustrative of the compounds which may be used is not intended to be construed as limiting the invention to the particular compounds mentioned.

The reaction between the tertiary hydroperoxide and the olefinic compound, which can best be accomplished in an anhydrous medium, is suitably carried out at a temperature of about 10°–80° C., preferably however at a temperature of 40–50° C. or at a temperature slightly below the decomposition temperature of the peroxide concerned.

The reaction is catalyzed by small quantities of both inorganic or organic acid-reacting compounds, such as perchloric acid, sulphuric acid, borontrifluoride, hydrogenchloride, hydrogenbromide, para-toluenesulphonic acid, benzene sulphonic acid and meta-benzenedisulphonic acid.

If the catalyst to be used is not soluble in the reaction medium or is soluble only to a small extent, the reaction is preferably performed in the presence of aliphatic monocarboxylic acids, such as acetic acid.

If para-toluene sulphonic acid is used as a catalyst, 0.1–10.0 g. (respectively 0.1–4.0 g.) per mole of peroxide will usually suffice. If the catalyst is HCl, 0.1–4.0 g. per mole of peroxide will be found sufficient.

The ditertiary peroxide produced as a result of the reaction is readily recovered from the reaction mixture by washing the reaction mixture with an alkali and then washing it free of alkali. The mixture is then dried and then any volatile impurities are eliminated by vacuum distillation at temperatures below those at which the product distills over.

In order that the invention may be readily understood by those skilled in the art, the following specific examples are given by way of illustration.

*Example I.—Preparation of cumyl-tertiary butylperoxide*

24.0 g. of technical (75%) tertiary butylhydroperoxide (0.2 mole) were mixed with 23.6 g. of alpha-methylstyrene (0.2 mole). Thereafter, a solution of 0.4 g. of perchloric acid (0.004 mole) in 20 ml. of glacial acetic acid was added to the mixture.

The reaction mixture was heated with stirring at a temperature of 40° C. for 6 hours.

In order to isolate the cumyl-tertiary butylperoxide formed, the reaction mixture was washed with 1 N NaOH and subsequently freed from alkali with water. Thereafter the volatile impurities were eliminated at a pressure of 15 mm. and subsequently at a pressure of 1 mm. and at a temperature of 60° C., after which the product was distilled over.

20.8 g. of cumyl-tertiary butylperoxide with a boiling point of 40° C. at 0.1 mm., were obtained. $N_{20}=1.4803$.

The preparation was repeated using 1.52 g. of para-toluene sulphonic acid (0.008 mole) instead of the solution of perchloric acid in glacial acetic acid. On heating the reaction mixture at a temperature of 45° C. for 20 hours, 32.5 g. of cumyl-tertiary butylperoxide was obtained.

*Example II.—Preparation of dicumylperoxide*

43.4 g. of technical (70%) cumylhydroperoxide (0.2 mole) were mixed with 23.6 g. of alpha-methylstyrene (0.2 mole). Thereafter 0.038 g. of para-toluene sulphonic acid (0.0002 mole) was added to the mixture.

The reaction mixture was heated with stirring at a temperature of 45° C. for 24 hours.

In order to isolate the dicumylperoxide formed, the reaction mixture was washed with 1 N NaOh and subsequently freed from alkali with water.

The volatile impurities were eliminated at a pressure of 15 mm. and subsequently at a pressure of 0.1 mm. and at a temperature of 90° C., after which the product was cooled.

30.2 g. of dicumylperoxide (90%) were obtained.

*Example III.—Preparation of cumyl-tertiary butylperoxide*

3.65 g. (0.1 mole) of dry hydrogen chloride were brought into 135.7 g. (1.15 mole) of alpha-methylstyrene. Subsequently 92 g. of tertiary butylhydroperoxide (98%) (1 mole) were added, after which the mixture was heated with stirring at a temperature of 50° C. for 5 hours.

In order to isolate the cumyl-tertiary butylperoxide formed, the reaction mixture was washed with 4 N NaOH and subsequently freed from alkali with water.

After drying on anhydrous potassium carbonate the volatile impurities were eliminated and subsequently the cumyltertiary butylperoxide was distilled off at a pressure of 0.25 mm. and at a temperature of 42° C.

148 g. of cumyl-tertiary butylperoxide were obtained. $N_{20}=1.4800$.

*Example IV.—Preparation of dicumylperoxide*

1.82 g. (0.05 mole) of dry hydrogen chloride were brought into 129.8 g. (1.1 mole) of alpha-methylstyrene. Subsequently 217 g. of cumylhydroperoxide (70%) (1 mole) were added, after which the mixture was heated with stirring at a temperature of 40° C. for 5 hours.

In order to isolate the dicumylperoxide formed the reaction mixture was washed with 4 N NaOH and subsequently freed from alkali with water.

Thereafter the volatile impurities were eliminated at a pressure of 15 mm. and subsequently at a pressure of 1 mm. and at a temperature of 95° C., after which the product was cooled. 182 g. of dicumylperoxide (98.2%) were obtained.

*Example V.—Preparation of 2-(t-butylperoxy)-2,4,4-trimethylpentane*

112 g. (1 mole) of diisobutylene were mixed with 91 g. of tertiary butylhydroperoxide (99%) (1 mole). Subsequently 7.6 g. (0.04 mole) of crystallised para-toluenesulphonic acid were added to this mixture with stirring, while the temperature raised to 40° C. The mixture was maintained at this temperature for 4 hours.

In order to isolate the product formed the reaction mixture was washed with 4 N NaOH and subsequently freed from alkali with water.

After drying on anhydrous sodium sulphate the volatile impurities were distilled in vacuo after which 52 g. of 2-(t-butylperoxy)-2,4,4-trimethylpentane were obtained by distillation. Boiling pt. 45° C./3 mm. Hg.

$N_{20}=1.4179$

| Mol. weight—Analysis | Calculated 202 | | Found 199 |
|---|---|---|---|
| | Percent C | Percent H | Percent O |
| Found | 70.6 | 12.8 | 16.6 |
| Calculated | 71.3 | 12.8 | 15.9 |

*Example VI.—Preparation of 2,5-di(tertiary butylperoxy)-2,5-dimethylhexane*

22 g. (0.2 mole) of 2,5-dimethylhexadiene-1,5 were mixed with 48 g. (0.4 mole) of tertiary butylhydroperoxide (75%). Subsequently 1.52 g. (0.008 mole) of crystallised para-toluene sulphonic acid were added to this mixture with stirring, after which the mixture was heated at 45° C. for 5 hours.

In order to isolate the product formed the reaction mixture was washed with 4 N NaOH and subsequently freed from alkali with water. After drying on anhydrous sodium sulphate the volatile impurities were distilled off in vacuo after which 15.2 g. of 2,5-di(tertiary butylperoxy)-2,5-dimethylhexane were obtained by distillation. Boiling pt. 42° C./0.06–0.07 mm. Hg. $N_{20}=1.4210$.

*Example VII.—Preparation of 1,4-bis(tertiary butylperoxyisopropyl)benzene*

174 g. (1.1 mole) of para-diisopropenylbenzene were dissolved in benzene whereafter 0.2 mole (7.3 g.) of dry hydrogen chloride were introduced. Subsequently 184 g. of tertiary butylhydroperoxide 98% (2 moles) were added, after which this mixture was heated to 50° C. for 5 hours with stirring. The reaction mixture was washed with 4 N NaOH and subsequently freed from alkali with water. After drying on anhydrous potassium carbonate the benzene was distilled off and the product obtained was recrystallised, after which 237 g. of 1,4-bis(tertiary butylperoxyisopropyl) benzene were obtained.

Melting pt. 79° C. Molecular weight: found 331, calculated: 338.

*Elementary analysis.*—Found C, 70.6%; H, 10.2%, O, 19.2%. Calculated C, 71.0%; H, 10.1%, O, 18.9%.

*Example VIII.—Vulcanisation of ethylene/propylene copolymer with 1,4 bis(tertiary butylperoxyisopropyl) benzene*

100 parts of an ethylene/propylene copolymer containin 40 mole percent of propylene were mixed on mixing rolls with 50 parts of HAF carbon black and 3 parts of 1,4 bis(tertiary butylperoxyisopropyl)benzene, prepared in the preceding example.

The resulting mixture was vulcanised in a press at 160° C. for 30 minutes.

The mechanical properties of the vulcanised product are comparable to those obtained with 4 parts of dicumylperoxide under essentially the same conditions. The effect of the addition of sulphur in a quantity of about 1% is the same in both cases.

The reduced quantity of 1,4 bis(tertiary butylperoxyisopropyl)benzene, necessary to obtain satisfactory results may be accounted for by the fact that this peroxide contains two peroxide groups instead of one.

*Example IX.—Vulcanisation of natural rubber with 1,4 bis(tertiary butylperoxyisopropyl)benzene*

100 parts by weight of natural rubber (smoked sheets) were compounded on a rubber mill with 50 parts by weight of furnace black and 1.5 parts by weight of 1,4 bis(tertiary butylperoxyisopropyl)benzene. The rolls of the mill were maintained at about 75° C.

After thoroughly mixing the sheet was cured at 150° C. for 30 minutes. The tensile strength of a product prepared in this way is well above 2,000 p.s.i. and its general properties are virtually the same as those obtained by using 2.5 parts by weight of dicumyl peroxide.

I claim:

A process for vulcanizing polymers selected from the group consisting of polyolefins and natural rubber comprising mixing about 100 parts by weight of the polymer to be vulcanized with up to 50 parts by weight of carbon black and about 3 parts by weight of a catalyst consisting essentially of 2-tertiary butyl-peroxy-2,4,4 trimethylpentane.

References Cited by the Examiner

UNITED STATES PATENTS

| | | | |
|---|---|---|---|
| 3,118,866 | 1/1964 | Gregorian | 260—94.9 |
| 3,129,204 | 4/1964 | Gilmont | 260—610 |
| 3,135,805 | 1/1964 | Gilmont | 260—610 |

OTHER REFERENCES

Davies et al.: Chem. Soc. Jour. (London), pages 2200–2204 (1954).

MORRIS LIEBMAN, *Primary Examiner.*

A. LIEBERMAN, *Assistant Examiner.*